United States Patent
Nagai et al.

(10) Patent No.: US 7,566,862 B2
(45) Date of Patent: Jul. 28, 2009

(54) DEVICE, METHOD, AND PROGRAM FOR RESPONDING BASED ON CHANGE IN WAVELENGTH OF LIGHT

(75) Inventors: Shoji Nagai, Tokyo (JP); Kentaro Odaka, Tokyo (JP); Yoshihito Ishibashi, Tokyo (JP); Fumio Kubono, Tokyo (JP)

(73) Assignee: Sony Corporation, Tokyo (JP)

( * ) Notice: Subject to any disclaimer, the term of this patent is extended or adjusted under 35 U.S.C. 154(b) by 86 days.

(21) Appl. No.: 11/775,503

(22) Filed: Jul. 10, 2007

(65) Prior Publication Data

US 2008/0048099 A1 Feb. 28, 2008

(30) Foreign Application Priority Data

Jul. 11, 2006 (JP) .............................. 2006-190643

(51) Int. Cl.
*H01J 40/14* (2006.01)

(52) U.S. Cl. ...................................... 250/221; 250/205

(58) Field of Classification Search ................. 250/221, 250/203.4, 222.1, 559.4, 214 R, 214 AL, 250/214 B, 205; 136/205, 206, 244, 246, 136/254, 213; 244/172.8, 168, 171.7
See application file for complete search history.

(56) References Cited

U.S. PATENT DOCUMENTS

| 4,449,057 A | 5/1984 | Ishiwata |
| 5,089,055 A * | 2/1992 | Nakamura ................... 136/248 |
| 2005/0117096 A1 | 6/2005 | Voloschenko et al. |
| 2006/0131504 A1 | 6/2006 | Kerr et al. |
| 2006/0221039 A1 | 10/2006 | Ishiguchi |

FOREIGN PATENT DOCUMENTS

JP 2004-202759 7/2004

OTHER PUBLICATIONS

Search Report and Written Opinion dated Dec. 20, 2007.

* cited by examiner

*Primary Examiner*—Que T Le
(74) *Attorney, Agent, or Firm*—Finnegan, Henderson, Farabow, Garrett & Dunner, LLP

(57) ABSTRACT

The present invention provides an information processing device, having a power generating element for converting light into power, for performing processing responsive to an environment in which a wavelength of illuminating light changes. The device includes a plurality of power generating elements whose power generating efficiencies are deflected with respect to light having different predetermined wavelengths, respectively; a plurality of voltage detecting sections for detecting voltages of power generated by the plurality of power generating elements, respectively; a determining section for determining any of the plurality of power generating elements, whose power generating efficiency is different relative to the others on the basis of the respective detected voltages of the plurality of power generating elements, to determine a surrounding environment on the basis of a determination result; and a processing section for performing processing responsive to the determined surrounding environment.

6 Claims, 8 Drawing Sheets

FIG.1
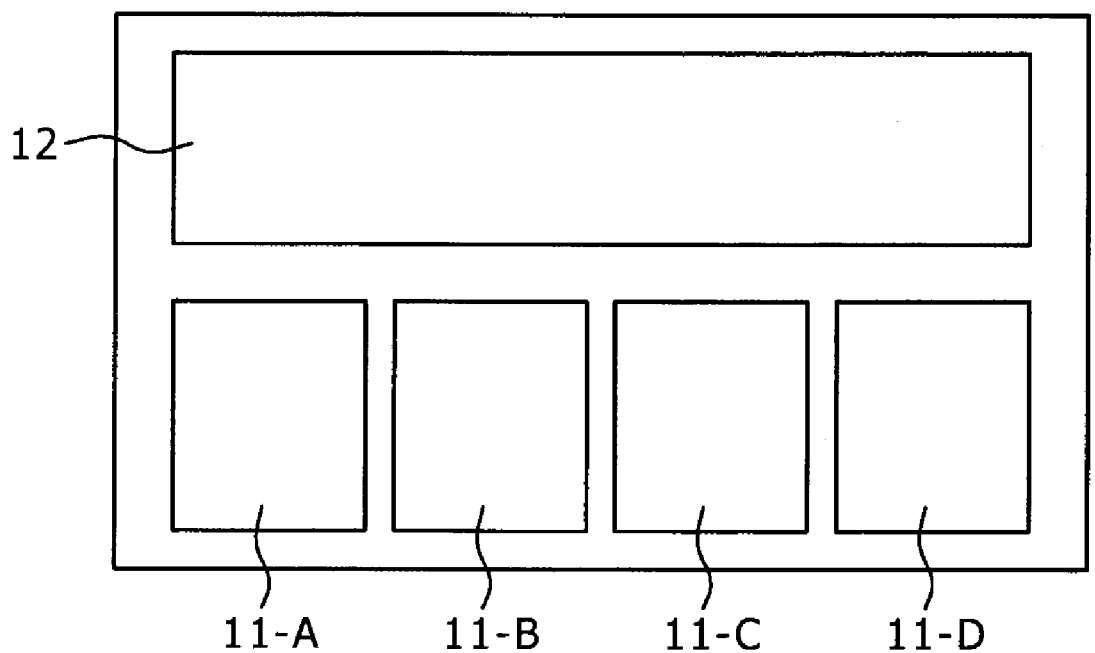

F I G . 9
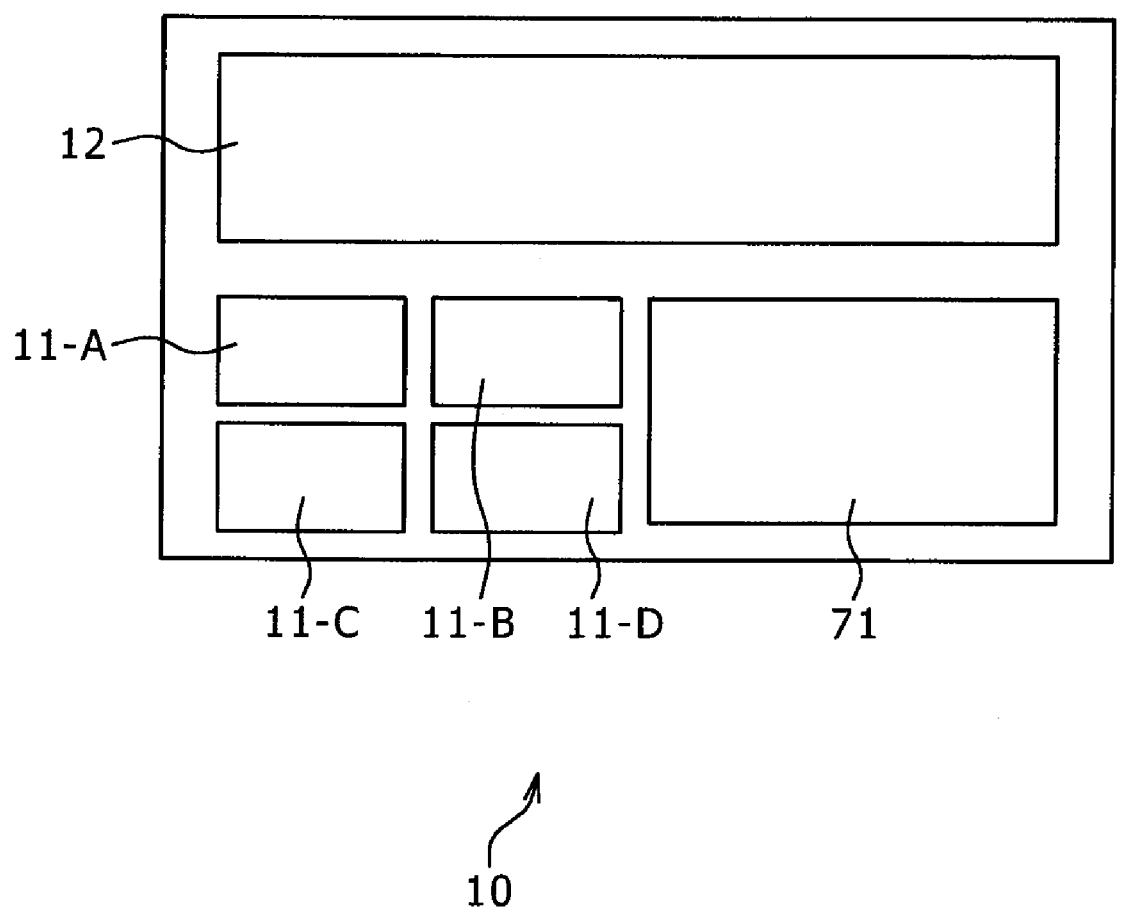

DEVICE, METHOD, AND PROGRAM FOR RESPONDING BASED ON CHANGE IN WAVELENGTH OF LIGHT

BACKGROUND OF THE INVENTION

1. Field of the Invention

The present invention relates to an information processing device, an information processing method, and a program, and particularly to an information processing device, an information processing method, and a program configured to detect a change in the wavelength of environmental light to execute processing responsive to current environmental light.

2. Description of Related Art

For example, equipment has been available, which operates responsive to a change in environmental light, such as a streetlight that turns on when it gets dark due to, e.g., sunset, a display that automatically adjusts its luminance responsive to the brightness of a room light, a remote controller (see, e.g., Japanese Patent Application Publication (KOKAI) No. 2004-202759) that adjusts display of a built-in liquid crystal display responsive to illuminance of environmental light, and the like.

SUMMARY OF THE INVENTION

However, the related art equipment that operates responsive to a change in environmental light merely detects the brightness (illuminance) of the environmental light, and is thus unable to accommodate a change in environmental light in which, e.g., the brightness of the environmental light does not change much but its color or the type of illumination changes.

Note that various types of sensors designed for detecting, e.g., the color of environmental light or the type of illumination have been available. Accordingly, by using such dedicated sensors, equipment can be realized which can accommodate a change in environmental light in which, e.g., the brightness of the environmental light does not change much but its color or the type of illumination changes. However, from the viewpoints of cost reduction and space saving, it is desirable to deal with the above-mentioned change in environmental light without using such dedicated sensors.

The present invention has been made in view of such circumstances, and provides equipment that performs processing responsive to, e.g., a color of environmental light or a type of illumination without using dedicated sensors.

An information processing device according to an embodiment of the present invention is provided with a power generating element for converting light into power and performs processing responsive to an environment in which a wavelength of emitted light changes. The information processing device includes a plurality of power generating elements whose power generating efficiencies are deflected with respect to light having different predetermined wavelengths, respectively; a plurality of voltage detecting sections for detecting voltages of power generated by the plurality of power generating elements, respectively; a determining section for determining any of the plurality of power generating elements, whose power generating efficiency is different relative to the others on the basis of the respective detected voltages of the plurality of power generating elements, to determine a surrounding environment on the basis of a determination result; and a processing section for performing processing responsive to the determined surrounding environment.

The processing section can be configured to perform, as the processing responsive to the determined surrounding environment, at least one of control over display of a screen by a display, control over audio output, and control over execution of a program.

The plurality of power generating elements whose power generating efficiencies are deflected with respect to the light having the different predetermined wavelengths, respectively, may be dye-sensitized solar cells, and the wavelengths of the light by which the power generating efficiencies increase may differ for each power generating element.

The plurality of power generating elements whose power generating efficiencies are deflected with respect to the light having the different predetermined wavelengths can be solar cells covered with filters that transmit different wavelengths of light therethrough, respectively.

An information processing method according to an embodiment of the present invention is a method for an information processing device which is provided with power generating elements for converting light into power and performs processing responsive to an environment in which a wavelength of illuminating light changes. The information processing method includes the steps of detecting voltages of power generated by a plurality of power generating elements whose power generating efficiencies are deflected with respect to light having different predetermined wavelengths, respectively; determining any of the plurality of power generating elements, whose power generating efficiency is different relative to the others on the basis of the respective detected voltages of the plurality of power generating elements, to determine a surrounding environment on the basis of a determination result; and performing processing responsive to the determined surrounding environment.

A program according to an embodiment of the present invention is a program for controlling an information processing device which is provided with power generating elements for converting light into power and performs processing responsive to an environment in which a wavelength of illuminating light changes. The program causes a computer to execute processing including the steps of detecting voltages of power generated by a plurality of power generating elements whose power generating efficiencies are deflected with respect to light having different predetermined wavelengths, respectively; determining any of the plurality of power generating elements, whose power generating efficiency is different relative to the others on the basis of the respective detected voltages of the plurality of power generating elements, to determine a surrounding environment on the basis of a determination result; and performing processing responsive to the determined surrounding environment.

According to an embodiment of the present invention, voltages of power generated by a plurality of power generating elements whose power generating efficiencies are deflected with respect to light having different predetermined wavelengths are detected, respectively, any of the plurality of power generating elements, whose power generating efficiency is different relative to the others, is determined on the basis of the respective detected voltages of the plurality of power generating elements, and then a surrounding environment is determined on the basis of a determination result, to perform processing responsive to the determined surrounding environment.

BRIEF DESCRIPTION OF THE DRAWINGS

FIG. 1 is a schematic view of a portable information processing device to which the present invention is applied;

FIG. 9 is a schematic diagram showing a modified example of the portable information processing device.

DESCRIPTION OF THE EMBODIMENTS

Figure 2:
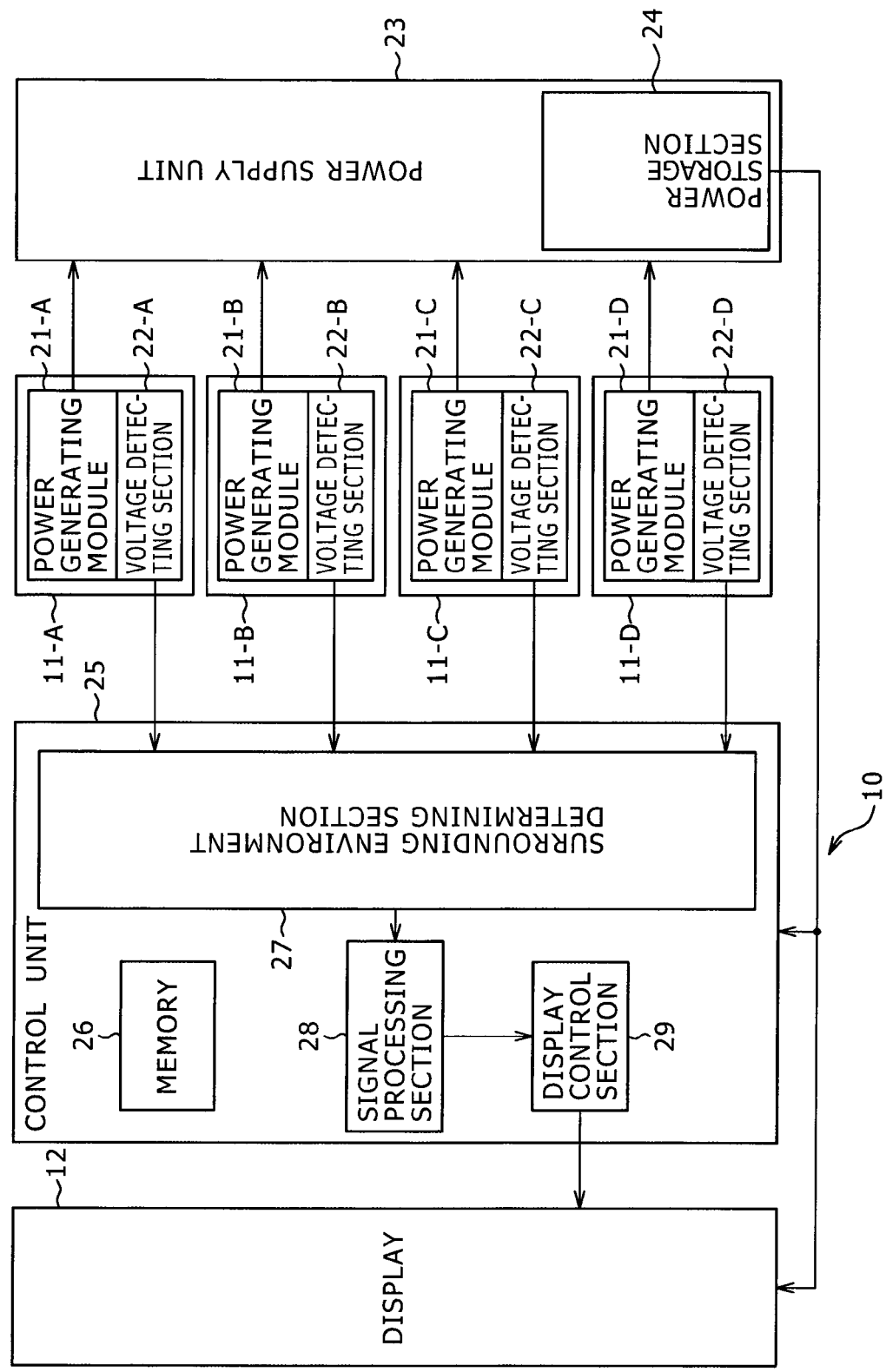
FIG. 2 is a block diagram showing a first configuration example of the portable information processing device.

Specific embodiments to which the present invention is applied will be described below in detail with reference to the accompanying drawings.

FIG. 1 is a schematic view of a portable information processing device, which is an embodiment of the present invention. This portable information processing device 10 detects an environmental change (specifically, a change in the wavelength of illuminating light) and performs processing responsive to an environment on the basis of a detection result. The potable information processing device 10 has a plurality (four in the case of FIG. 1) of specific wavelength-responsive solar cell elements 11-A to 11-D and a display 12 for displaying predetermined information, on an external surface thereof.

The specific wavelength-responsive solar cell elements 11-A to 11-D provided on the surface of this portable information processing device 10 are configured such that their power generating efficiencies increase responsive to light having different predetermined wavelengths, respectively. Therefore, if illuminating light sources of the different wavelengths are provided in a plurality of environments, respectively, by comparing the power generating efficiencies of the specific wavelength-responsive solar cell elements 11-A to 11-D, a surrounding environment of a place where the portable information processing device 10 is currently located can be determined. Note that the term "surrounding environment" used in the present specification and appended claims is intended to mean a surrounding environment of a place where this portable information processing device 10 is currently located. The specific wavelength-responsive solar cell elements 11-A to 11-D are described below as being specific to different wavelengths A to D, respectively.

Note that the number of the specific wavelength-responsive solar batter cells 11-A to 11-D (hereinafter simply called "specific wavelength-responsive solar cell element(s) 11" unless otherwise required to be individually distinguished) for converting illuminating light into power is not limited to four.

What kind of processing is to be performed for an environmental change detected can be determined arbitrarily. For example, when an environmental change is detected, an image for display on the display 12 may be changed, or audio for output from a speaker, not shown, may be changed. Such a technique makes it possible to perform the following information processing. Namely, in an art museum or the like, if the wavelengths of illumination used near exhibits are varied for each exhibit, an appropriate image corresponding to the exhibit can be displayed on the portable information processing device, or appropriate audio guidance can be given.

The specific wavelength-responsive solar cell elements 11-A to 11-D whose power generating efficiencies increase with respect to light having specific wavelengths, respectively, can be realized by using, e.g., dye-sensitized solar cells.

Characteristics of dye-sensitized solar cells will be described.

At present, dye-sensitized solar cells are inferior in their power generating efficiency compared with related art solar cells using Si (silicon). However, the dye-sensitized solar cells have the following advantages. Not using silicon, they may be manufactured less expensively. Since their manufacturing processes are equivalent to those of liquid crystals, they have high mass-production efficiency. Since an organic dye is used, coloring is easy. By selecting an organic dye, their light absorbing properties can be controlled. Since a glass substrate is not used, they can be bent. They can be formed into a thinner structure.

Known organic dyes include phenylxanthene dyes, phthalocyanine dyes, coumarin dyes, cyanine dyes, merocyanine dyes, porphyrin dyes, and proflavine dyes. They have different light absorbing properties and different color reproduction properties. Even by using one of these dyes alone or some of them in mixture, special light absorbing properties can be obtained, and color reproduction can be controlled. Furthermore, it is predicted that a dye whose wavelength range is limited will be invented through future research and development. Therefore, by using these dyes, the light absorbing properties and color reproduction can be controlled.

By utilizing the light absorbing properties and the color reproduction controlling properties, the power generating efficiencies of the specific wavelength-responsive solar cell elements 11-A to 11-D can be made specific to the different wavelengths A to D, respectively.

The display 12 may be formed of, e.g., an electronic paper or a liquid crystal panel.

FIG. 2 shows a first configuration example of the portable information processing device 10. The portable information processing device 10 includes, in addition to the specific wavelength-responsive solar cell elements 11 and the display 12 provided on the external surface of its housing as mentioned above, a power supply unit 23 for stably supplying power obtained from the specific wavelength-responsive solar cell elements 11 to a downstream stage, and a control unit 25 for performing processing responsive to a detected surrounding environment of a current location, using the specific wavelength-responsive solar cell elements 11 as sensors for detecting an environmental change.

The specific wavelength-responsive solar cell element 11-A includes a power generating module 21-A that receives illuminating light and converts the light into power, and a voltage detecting section 22-A that detects a voltage of the power generated by the power generating module 21-A. The power generating module 21-A outputs the generated power to the power supply unit 23. The voltage detecting section 22-A performs A/D conversion on the detected voltage for notification to a surrounding environment determining section 27 of the control unit 25.

Note that the specific wavelength-responsive solar cell elements 11-B to 11-D are configured similarly to the specific wavelength-responsive solar cell element 11-A, and thus their descriptions will be omitted.

In order to obtain a desired voltage, the power supply unit 23 has power lines from the power generating modules 21-A to 21-D properly connected thereto either parallelly or serially to accumulate power in a power storage section 24 formed of a built-in rechargeable battery or condenser, after which it supplies the power to the display 12 and the control unit 25 which are arranged downstream thereof.

The control unit 25 executes a program held in a built-in memory 26, to realize the surrounding environment determining section 27, a signal processing section 28, and a display control section 29. The surrounding environment determining section 27 determines a surrounding environment by comparing detection results from the voltage detecting section 22-A to 22-D, and notifies the signal processing section 28 of a determination result. The signal processing section 28 performs processing responsive to the notified determination result, and outputs a processing result to the display control section 29. The display control section 29 controls display of a screen by the display 12 such that the processing result from the signal processing section 28 is displayed thereon.

Note that the signal processing section 28 may be realized by either hardware or software. For example, for realization by software, it may be configured by installing a plurality of applications so as to change processing for execution according to an application for execution.

Furthermore, it may be configured, e.g., such that no processing is assigned to some of the specific wavelength-responsive solar cell elements. Still furthermore, single processing for execution may be determined responsive to a state of change of light (e.g., a change of light from red to blue, blue to yellow or the like) illuminating around a place.

Note that the above-mentioned change in the processing assignment to the specific wavelength-responsive solar cell elements 11 may be realized by modifying the hardware configuration of the signal processing section 28, or according to the processing to be executed by the installed applications.

Figure 3:
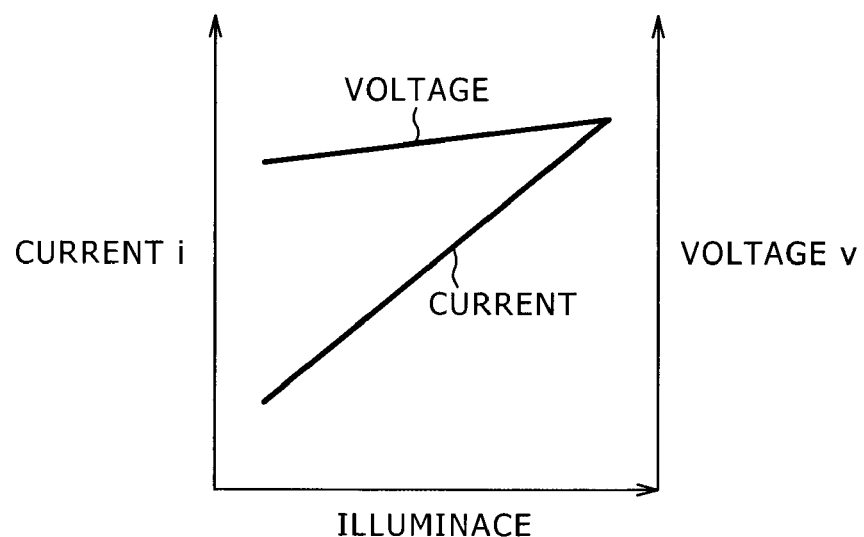
FIG. 3 is a diagram showing power generating characteristics of a solar cell.

Here, typical power generating characteristics of a solar cell applied also to the specific wavelength-responsive solar cell elements 11 will be described. FIG. 3 shows a relationship between a current i and a voltage v with respect to the illuminance of illuminating light. In the figure, the abscissa indicates the illuminance, and a left-hand ordinate indicates the current i, and a right-hand ordinate indicates the voltage v.

As is apparent from the figure, the voltage v drastically increases when the illuminance exceeds a predetermined value, thereafter exhibiting a piecemeal increase with increasing illuminance. By contrast, the current i increases proportionally with increasing illuminance.

Figure 4:
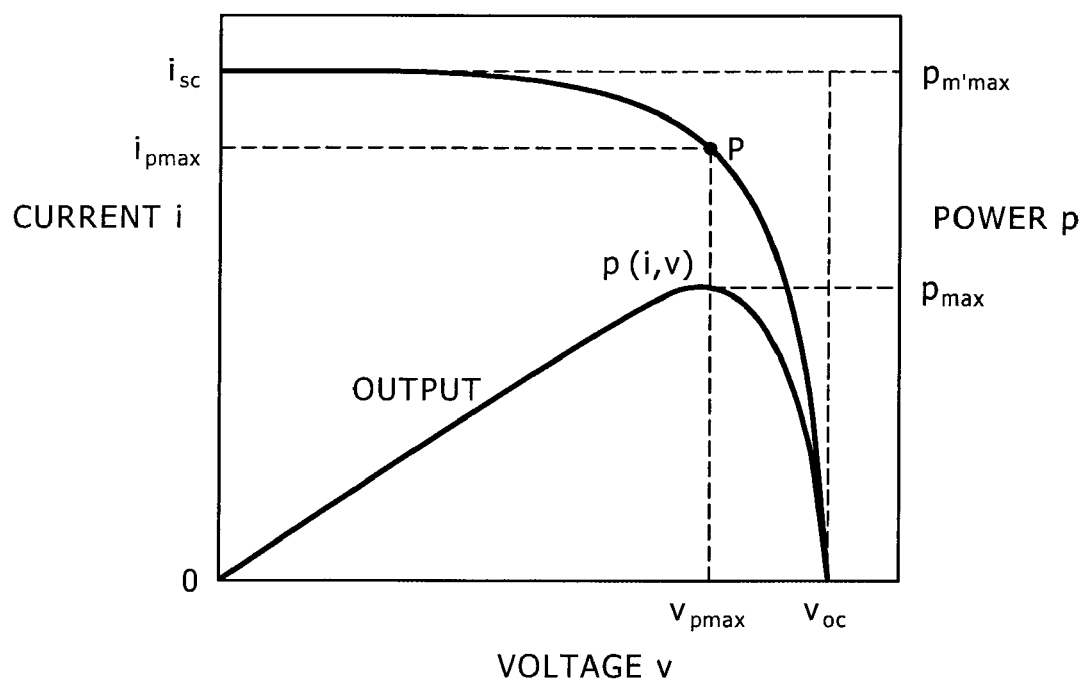
FIG. 4 is a diagram showing power generating characteristics of the solar cell.

FIG. 4 shows a correlation among the voltage v, the current i, and a power p being their product with respect to downstream load fluctuation. In the figure, the abscissa indicates the voltage v, a left-hand ordinate indicates the current i, and a right-hand ordinate indicates the power p. Here, the downstream load fluctuation is attributable to, e.g., a change in the charging state of the power storage section 24 of the power supply unit 23 and a change in the power consumption of the control unit 25 or the display 12, all of which are provided downstream of the specific wavelength-responsive solar cell elements.

As mentioned above, the voltage v, the current i, and the power p change in response not only to the illuminance, but also to the load fluctuation of the downstream circuits. As a result, the voltage v, the current i, and the power p move along transition curves such as shown in FIG. 4. Usually, a point on a transition curve at which the power p maximizes is determined as a power generating operation point P of the solar cell of interest.

However, the specific wavelength-responsive solar cell elements 11-A to 11-D have, as mentioned above, different light absorbing properties, and thus their transition curves do not necessarily coincide.

Figure 5:
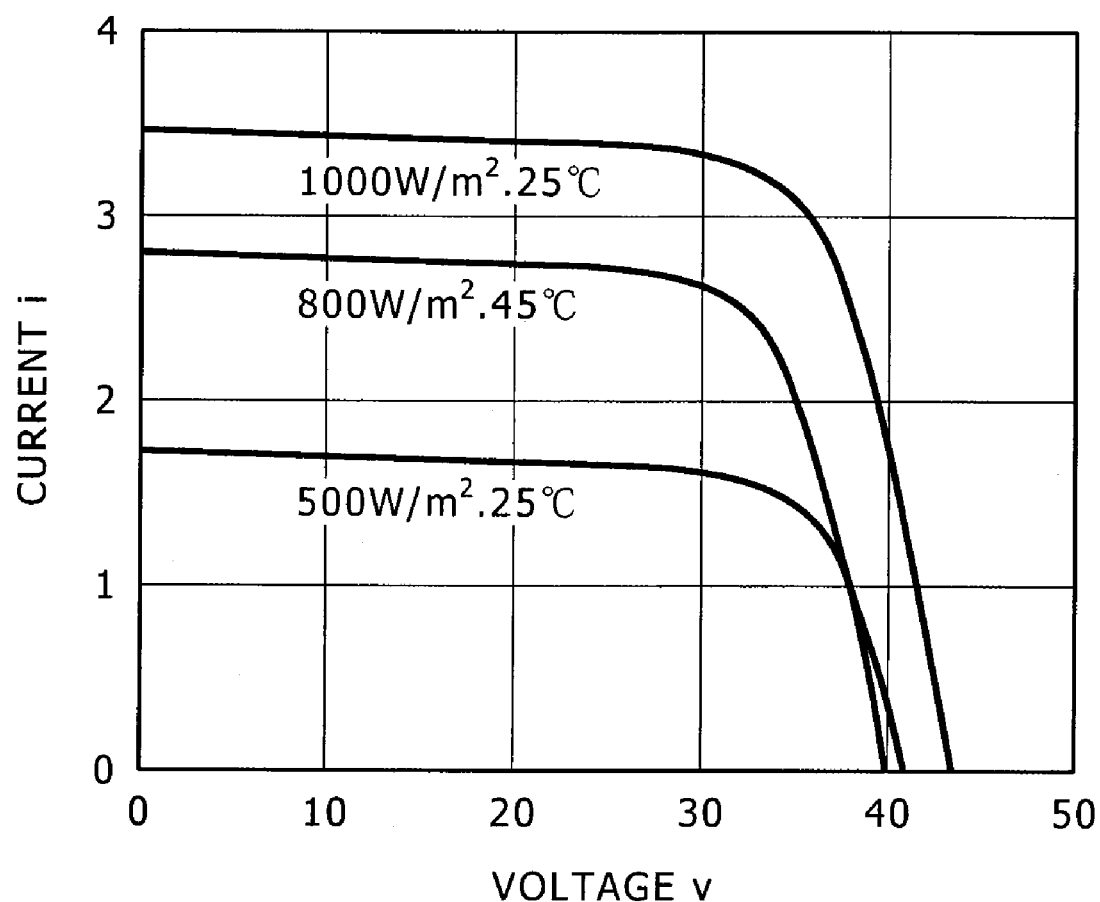
FIG. 5 is a diagram showing power generating characteristics of the solar cell.

FIG. 5 shows a correlation between the voltage v and the current i with respect to the downstream load fluctuation, for each of three different types of illuminances of illuminating light. In the figure, the abscissa indicates the voltage v, and the ordinate indicates the current i. As is apparent from the figure, a change in the illuminance results in a noticeable change in the current i.

On the basis of the above-described power generating characteristics of the solar cell, a specific wavelength-responsive solar cell element 11 of the portable information processing device 10 being the present embodiment detects, when irradiated with a predetermined wavelength, the predetermined wavelength as a voltage change to specify a surrounding environment.

Figure 6:
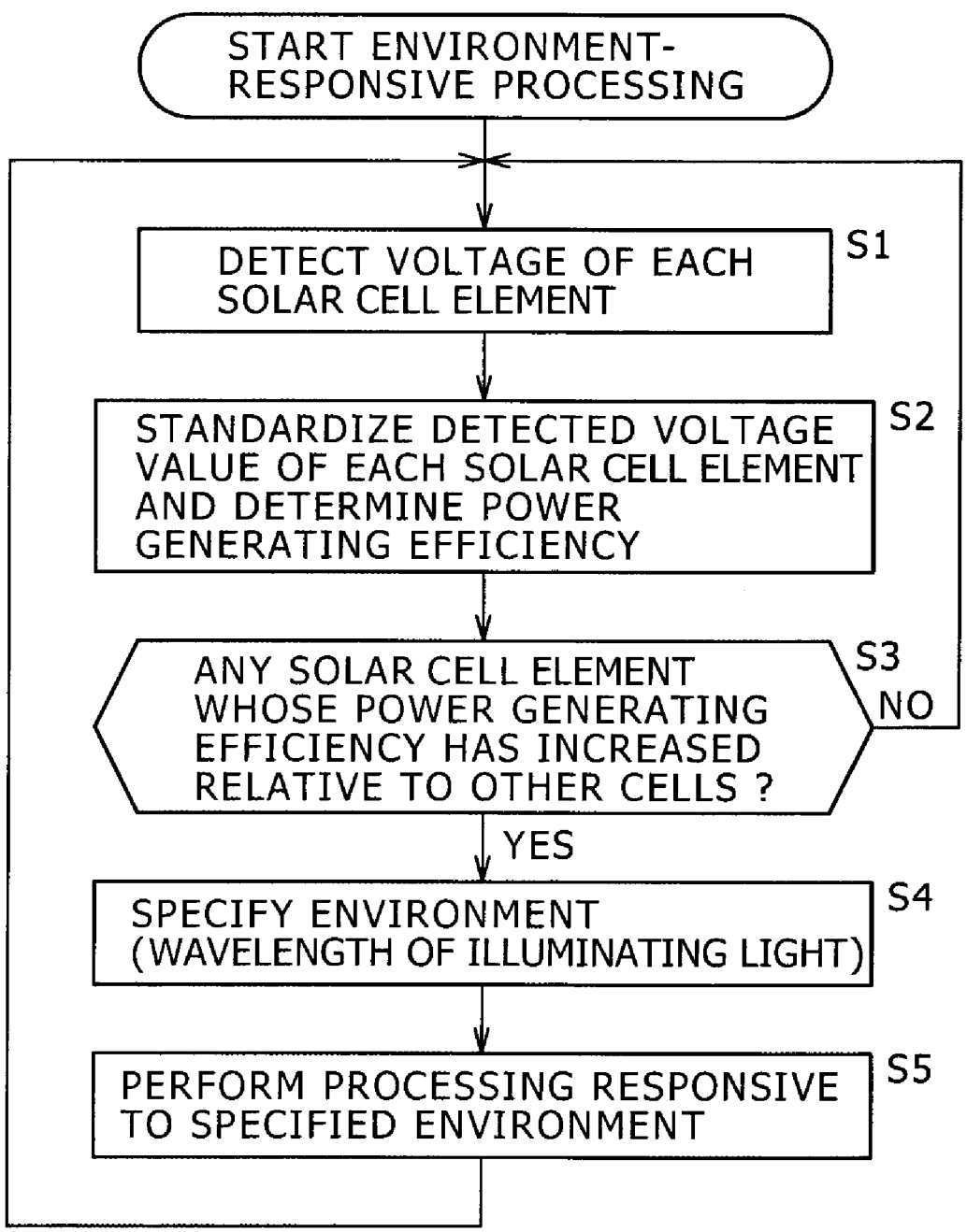
FIG. 6 is a flowchart for explaining a surrounding environment-responsive processing.

Referring next to a flowchart of FIG. 6, surrounding environment-based processing (hereinafter called "surrounding environment-responsive processing") executed in the portable information processing device 10 will be described. Note that illuminating light sources of the wavelengths A to D are supposed to be arranged respectively beforehand in environments to which a user moves while carrying the portable information processing device 10.

In step S1, the voltage detecting section 22 of each specific wavelength-responsive solar cell element 11 detects a voltage generated by the corresponding power generating module 21 to perform A/D conversion thereon, and notifies the surrounding environment determining section 27 of a value being a conversion result. In step S2, the surrounding environment determining section 27 compares the value (hereinafter called "detected voltage value") of the detected voltage being the conversion result notified from each specific wavelength-responsive solar cell element 11 with a standardization table prepared beforehand, to determine the power generating efficiency of each of the specific wavelength-responsive solar cell elements 11-A to 11-D.

In step S3, the surrounding environment determining section 27 determines whether or not any of the specific wavelength-responsive solar cell elements 11-A to 11-D has its power generating efficiency increased relative to the others. If it is determined that none of them have their power generating efficiencies increased relative to one another, the processing returns to step S1, to repeat the subsequent steps.

Conversely, if it is determined in step S3 that any of the cells has its power generating efficiency increased relative to the others, the processing proceeds to step S4. In step S4, the surrounding environment determining section 27 specifies a surrounding environment (the wavelength of illuminating light) on the basis of the specific wavelength-responsive solar cell element 11 which is determined to have had its power generating efficiency increased relative to the others, and notifies the signal processing section 28 of a specification result.

In step S5, the signal processing section 28 performs processing (e.g., creating text data, image data or the like corresponding to the surrounding environment) responsive to the specification result notified from the surrounding environment determining section 27, and outputs a processing result to the display control section 29. The display control section 29 controls (specifically, displays text, an image or the like corresponding to the surrounding environment) display by the display 12 on the basis of the inputted processing result.

Thereafter, the processing returns to step S1 to repeat the subsequent steps. The above describes the surrounding environment-responsive processing.

As described above, according to the surrounding environment-responsive processing of the portable information processing device 10, text, an image or the like suitable for a surrounding environment in which a user is currently located can be displayed without involving any user control. Note that audio suitable for a surrounding environment in which the user is currently located may be outputted, or a program suitable for a surrounding environment in which the user is currently located may be executed, alternatively.

By the way, in the above-mentioned portable information processing device 10, the detected voltage value of each specific wavelength-responsive solar cell element 11 has changed due to the downstream load fluctuation. Thus, referring to FIG. 7, another configuration example will be described in which a load stabilizing section is additionally provided such that the downstream load fluctuation will not affect each specific wavelength-responsive solar cell element 11 in order to reduce the detected voltage value change.

Figure 7:
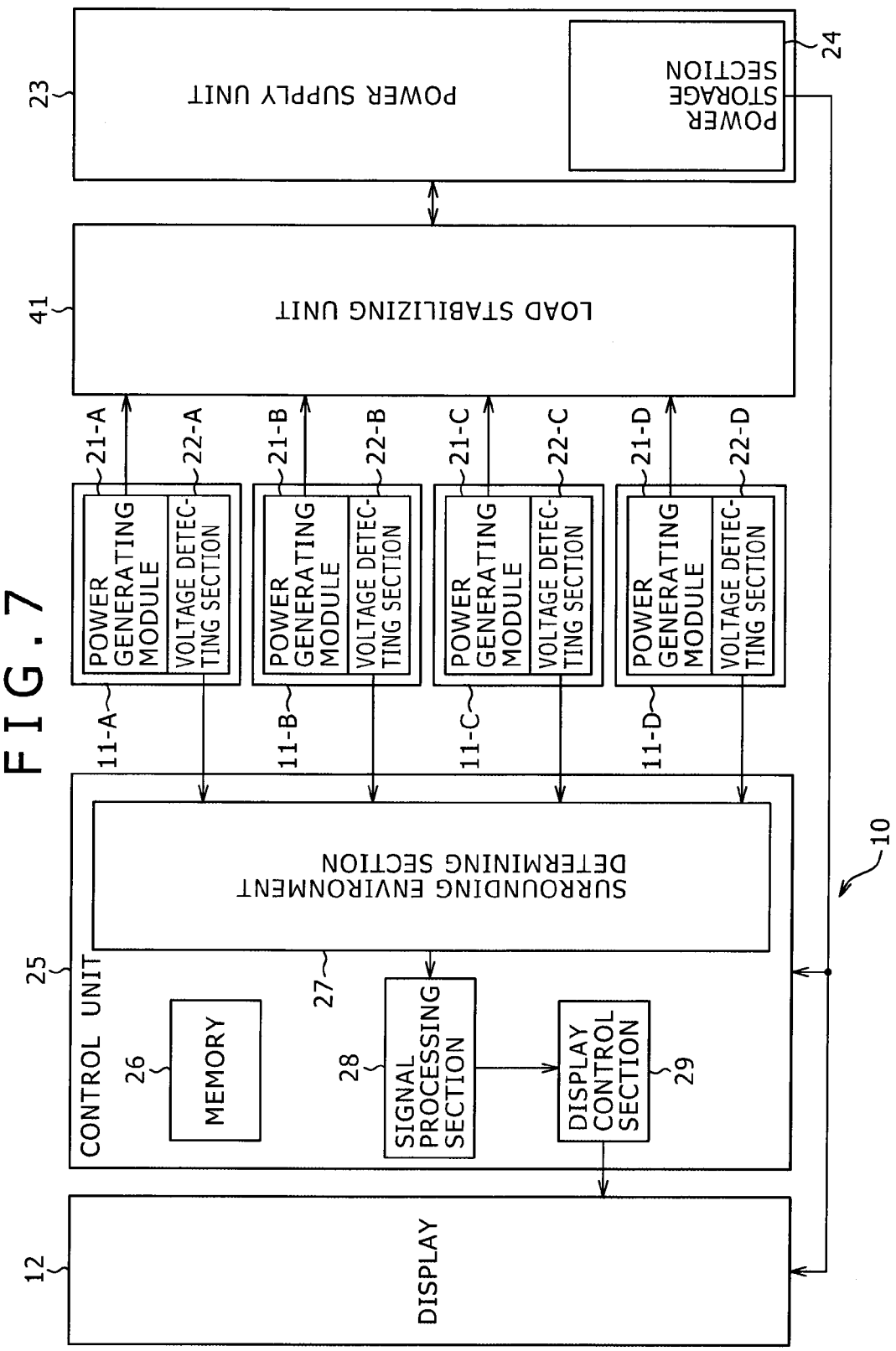
FIG. 7 is a block diagram showing a second configuration example of the portable information processing device.

FIG. 7 shows a second configuration example of the portable information processing device, which is an embodiment of the present invention. In this second configuration example, a load stabilizing section 41 is interposed between the solar cell elements 11 and the power supply unit 23 in the first configuration example shown in FIG. 2. The load stabilizing section 41 serves to stabilize load fluctuation affecting the specific wavelength-responsive solar cell elements 11 and caused by the circuits downstream of the power supply unit 23. Since components other than the load stabilizing section 41 are similar to those in the first configuration example and are given the same reference symbols, their descriptions will be omitted.

Figure 8:
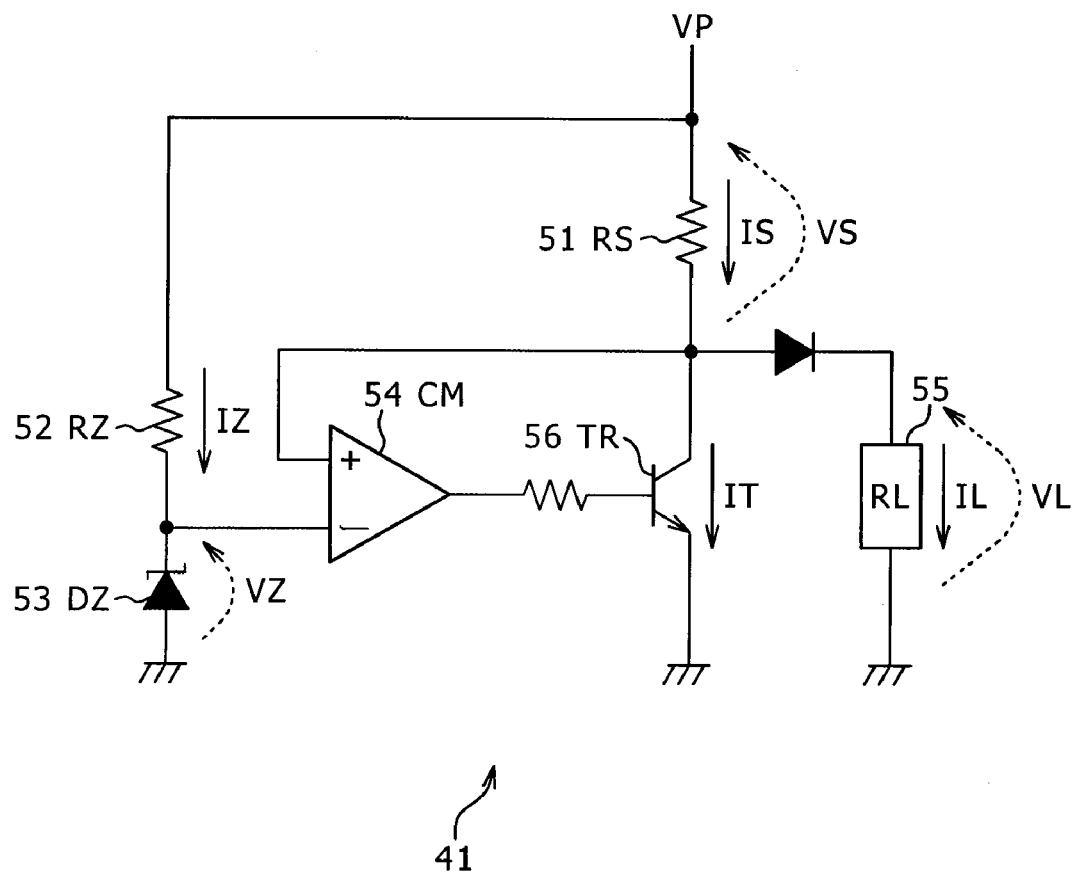
FIG. 8 is a block diagram showing a configuration example of a load stabilizing section of FIG. 7.

Referring to FIG. 8, a configuration example of the load stabilizing section 41 and its operation will be described.

A load current for a voltage VP of a specific wavelength-responsive solar cell element 11 equals the sum of a current IS flowing through a resistor (RS) 51 and a current IZ flowing through a resistor (RZ) 52.

Load current=$IS+IZ$

As to the current IZ flowing through the resistor (RZ) 52, only a constant current flowing through a Zener diode (DZ) 53 may be considered, given that the input impedance of a comparator (CM) 54 is sufficiently high.

$IZ$=constant

Meanwhile, the current IS flowing through the resistor (RS) 51 equals the sum of a current IL flowing through a circuit load (RL) equivalent to the power supply unit 23 and its downstream circuits, and a current IT flowing through a transistor (TR) 56.

$IS=IL+IT$

Therefore, if a voltage VS across the resistor (RS) 51 is stabilized, the current IS becomes also stabilized. Hence, the load current for the voltage VP of the specific wavelength-responsive solar cell element 11 can be stabilized.

Specifically, a breakdown voltage VZ of the Zener diode (DZ) 53 is set such that VZ=VP−VS. Here, since VS=RS·IS, the breakdown voltage VZ is given as follows:

$VZ=VP-(RS \cdot IS)$

For example, if the current IS flowing through the resistor (RS) 51 decreases by ΔIL from a desired constant current value, due to a decrease in the load of the circuit load (RL) 55, the breakdown voltage VZ of the Zener diode (DZ) 53 and the voltage across the resistor (RS) 51 have the following relationship:

$VZ<VP-(RS \cdot (IS-\Delta IL))$

From this relationship, output of the comparator (CM) 54 increases to increase the current IT flowing through the transistor (TR) 56, to increase the current IS flowing through the resistor (RS) 51. Since the comparator (CM) 54 keeps providing its output until the relationship VZ=VP−(RS·IS) is established, the current IS flowing through the resistor (RS) 51, as a result, returns to a condition prior to the occurrence of the current fluctuation ΔIL, to be stabilized. Therefore, the load current for the voltage VP across the specific wavelength-responsive solar cell element 11 is also stabilized.

Conversely, if the current IS flowing through the resistor (RS) 51 increases by ΔIL from a desired constant current value, due to an increase in the load of the circuit load (RL) 55, the breakdown voltage VZ of the Zener diode (DZ) 53 and the voltage across the resistor (RS) 51 have the following relationship:

$VZ>VP-(RS \cdot (IS+\Delta IL))$

From this relationship, the output of the comparator (CM) 54 drops to decrease the current IT flowing through the transistor (TR) 56, to decrease the current IS flowing through the resistor (RS) 51. Since the comparator (CM) 54 keeps providing its output until the relationship VZ=VP−(RS·IS) is established, the current IS flowing through the resistor (RS) 51, as a result, returns to a state prior to the occurrence of the current fluctuation ΔIL, to be stabilized. Therefore, the load current for the voltage VP across the specific wavelength-responsive solar cell element 11 is also stabilized.

Note that this load stabilizing section 41 may be applied not only for stabilizing a load for solar cells such as in the present embodiment, but also for stabilizing loads for power generating devices utilizing, e.g., temperature difference, wind force, pressure and the like.

As described in the foregoing, according to the portable information processing device 10 which is an embodiment of the present invention, the specific wavelength-responsive solar cell elements 11-A to 11-D are used not only for power generation, but also for detection of a change in surrounding environment (the wavelength of illuminating light). This realizes space saving compared with a configuration in which a dedicated sensor for detecting an environmental change is provided separately.

According to the embodiments of the present invention, equipment can be realized which performs processing responsive to, e.g., each color of environmental light or each type of illumination without using dedicated sensors.

Note that, instead of the specific wavelength-responsive solar cell elements, a configuration may be applicable in which a plurality of solar cell elements each having the same color absorbing property are installed, and these cell elements are covered with filters transmitting light having different wavelengths therethrough, respectively.

Alternatively, to cope with a case where the specific wavelength-responsive solar cell elements 11-A to 11-D are not enough to obtain a desired quantity of power, a solar cell element 71 may be added, which is not specific to a predetermined wavelength of illuminating light and thus is used only for power generation, as shown in, e.g., FIG. 9.

When installed onto a vehicle for moving type attraction in, e.g., a theme park, the portable information processing device 10 which is an embodiment of the present invention can, e.g., display descriptive information suitable for each location every time the vehicle moves to one of a plurality of environments providing illuminating light having different wavelengths, respectively. Alternatively, if, e.g., a visitor carries the portable information processing device 10 as an admission ticket, the visitor can display on the device a waiting time at the entrance of an attraction, or a menu at a restaurant, for example.

Note that any of the specific wavelength-responsive solar cell elements 11-A to 11-D whose power generating efficiency has increased relative to the others is specified, in the above-mentioned description. Instead, any of the specific wavelength-responsive solar cell elements 11-A to 11-D whose power generating efficiency has decreased relative to the others may be specified.

It should be understood by those skilled in the art that various modifications, combinations, sub-combinations and alterations may occur depending on design requirements and other factors insofar as they are within the scope of the appended claims or the equivalents thereof.

Cross References To Related Applications

The present document contains subject matter related to Japanese Patent Application JP 2006-190643filed in the Japanese Patent Office on Jul. 11, 2006, the entire contents of which being incorporated herein by reference.

What is claimed is:

1. An information processing device, provided with a power generating element for converting light into power, for performing processing responsive to an environment in which a wavelength of illuminating light changes, comprising:
   a plurality of power generating elements whose power generating efficiencies differ with respect to light having different predetermined wavelengths, respectively;
   a plurality of voltage detecting sections for detecting voltages of power generated by the plurality of power generating elements, respectively;
   a determining section for determining any of the plurality of power generating elements, whose power generating efficiency is different relative to the others on the basis of the respective detected voltages of the plurality of power generating elements, to determine a surrounding environment on the basis of a determination result; and
   a processing section for performing processing responsive to the determined surrounding environment.

2. The information processing device according to claim 1, wherein performing processing responsive to the determined surrounding environment comprises at least one of controlling a display of a screen, controlling an audio output, and controlling an execution of a program.

3. The information processing device according to claim 1, wherein the plurality of power generating elements are dye-sensitized solar cells, and
   wherein the wavelengths of the light by which the power generating efficiencies increase, differ for each power generating element.

4. The information processing device according to claim 1, wherein the plurality of power generating elements are solar cells covered with filters that transmit different wavelengths of light therethrough.

5. An information processing method for an information processing device, provided with a power generating element for converting light into power, for performing processing responsive to an environment in which a wavelength of illuminating light changes, comprising:
   detecting voltages of power generated by a plurality of power generating elements whose power generating efficiencies differ with respect to light having different predetermined wavelengths, respectively;
   determining any of the plurality of power generating elements, whose power generating efficiency is different relative to the others on the basis of the respective detected voltages of the plurality of power generating elements, to determine a surrounding environment on the basis of a determination result; and
   performing processing responsive to the determined surrounding environment.

6. A computer-readable medium including program instructions, which when executed by a processor, performs a method for performing processing responsive to an environment in which a wavelength of illuminating light changes, the method comprises:
   detecting voltages of power generated by a plurality of power generating elements whose power generating efficiencies differ with respect to light having different predetermined wavelengths, respectively;
   determining any of the plurality of power generating elements, whose power generating efficiency is different relative to the others on the basis of the respective detected voltages of the plurality of power generating elements, to determine a surrounding environment on the basis of a determination result; and
   performing processing responsive to the determined surrounding environment.

* * * * *